United States Patent [19]

Rosenberger, Jr.

[11] 3,822,646
[45] July 9, 1974

[54] CONVEYOR SYSTEM WITH PRIMARY AND AUXILIARY CODE MECHANISMS

[75] Inventor: Chester A. Rosenberger, Jr., Perkasie, Pa.

[73] Assignee: FMC Corporation, San Jose, Calif.

[22] Filed: Oct. 30, 1972

[21] Appl. No.: 302,374

[52] U.S. Cl. .................... 104/88, 198/38, 214/60
[51] Int. Cl. ........................... B61j 3/00, B41j 1/04
[58] Field of Search ............. 104/88, 96, 165, 170; 198/38; 214/11 R, 60

[56] References Cited
UNITED STATES PATENTS

| | | | |
|---|---|---|---|
| 3,056,360 | 10/1962 | Burmeister et al. | 104/88 |
| 3,103,183 | 9/1963 | Bradt et al. | 104/88 |
| 3,194,177 | 7/1965 | Bishop | 104/88 X |
| 3,200,933 | 8/1965 | Schenk et al. | 104/88 X |
| 3,526,192 | 9/1970 | Parshall | 104/88 |
| 3,556,012 | 1/1971 | Parshall | 104/88 |
| 3,563,479 | 2/1971 | Brouwer | 214/16 B X |

Primary Examiner—Robert G. Sheridan
Assistant Examiner—R. B. Johnson
Attorney, Agent, or Firm—J. F. Verhoeven; C. E. Tripp

[57] ABSTRACT

A conveyor system is disclosed in which carriages with tow pins are towed along the floor by engagement of the tow pins with a drive chain beneath the floor. The paths of carriage travel include an endless main line and a plurality of spur lines. Switches at the junctions of the main and spur lines are operated by code probes on the carriages to direct the carriages into the appropriate spur lines. One probe on each carriage is actuated as the carriage leaves a spur line empty after unloading to code the carriage for a spur line for empty carriages. The probe so actuated also serves to disable the mechanism by which the other code probes are read to prevent return of the empty carriage to the spur line for which it was originally coded when full.

12 Claims, 13 Drawing Figures

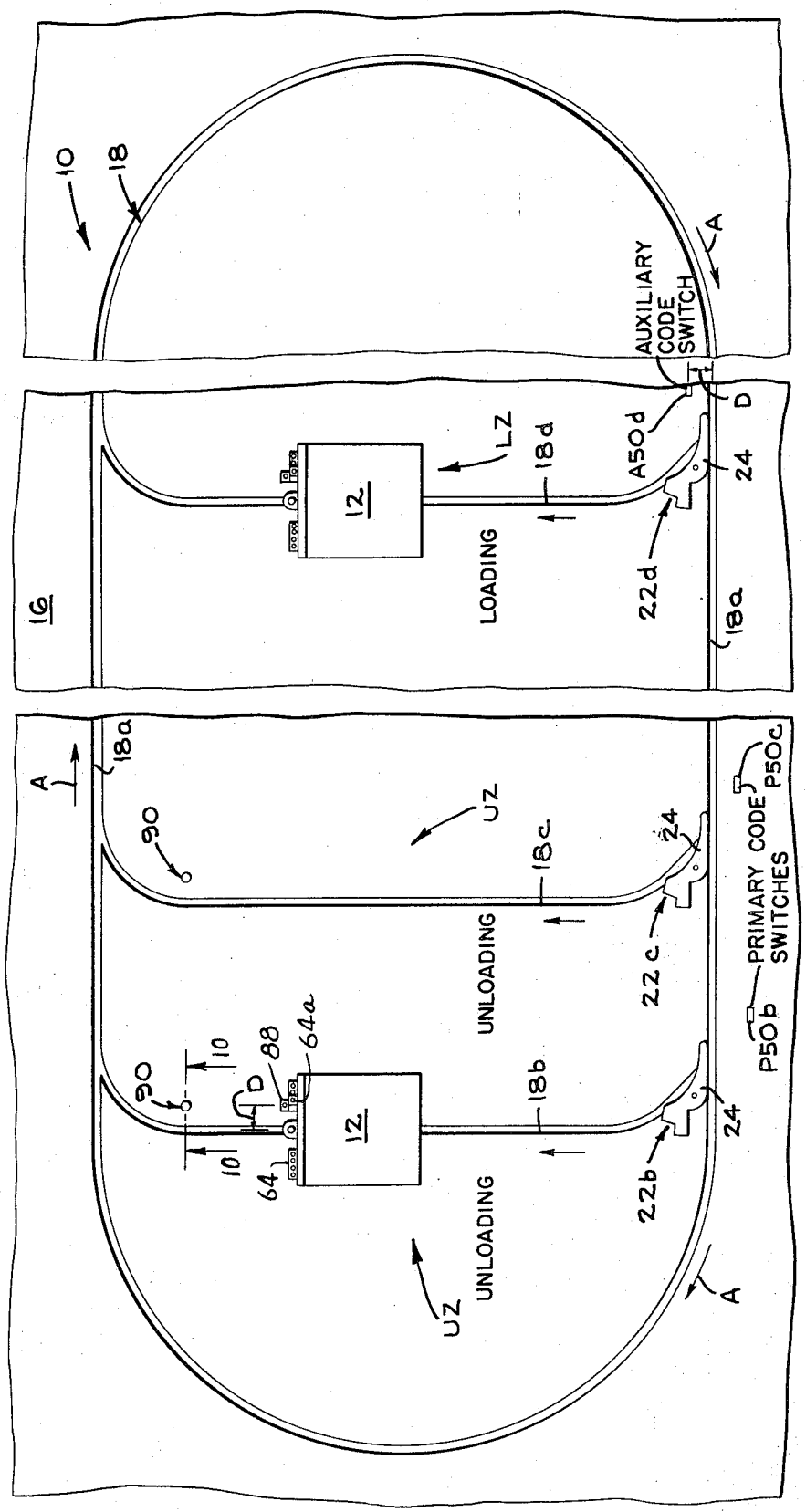

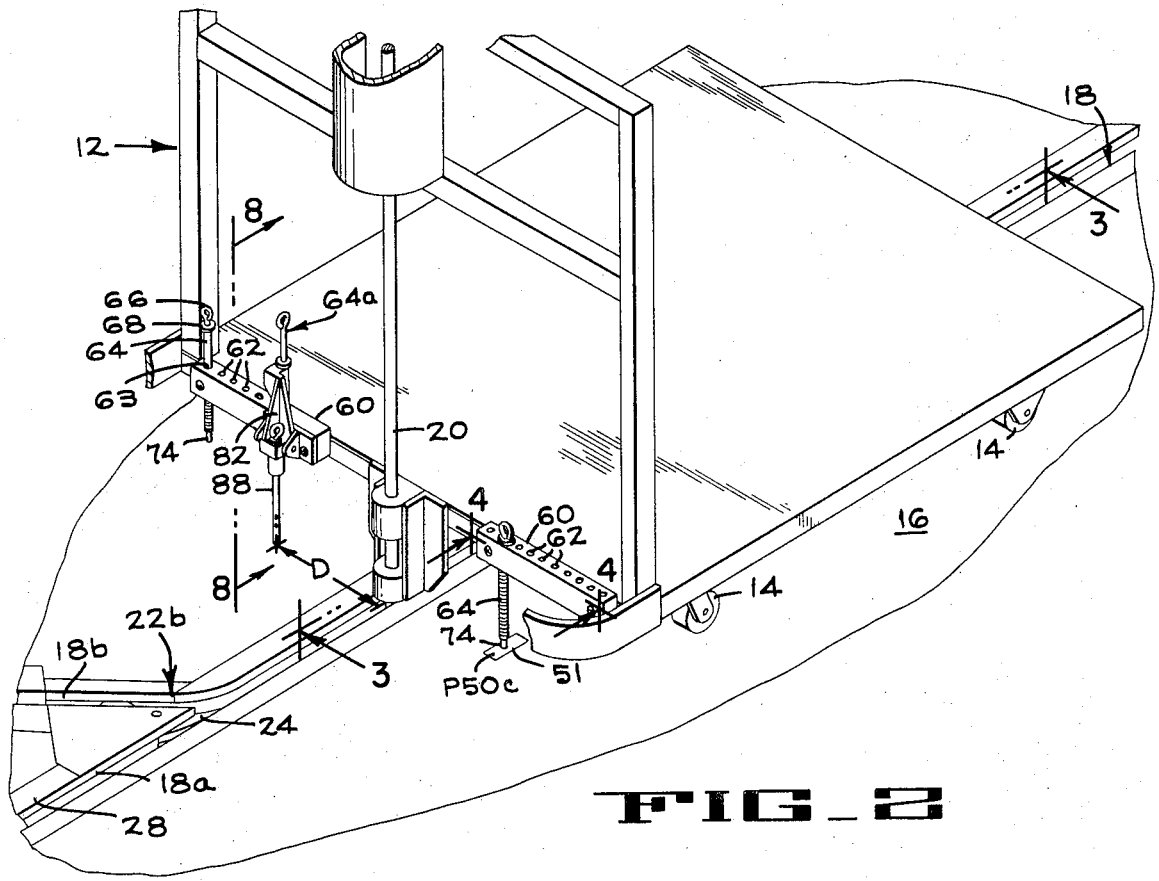
FIG_2
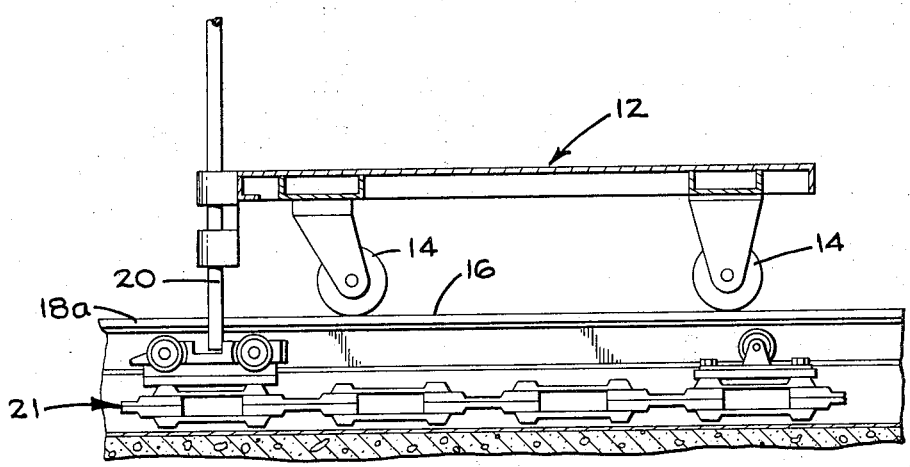
FIG_3

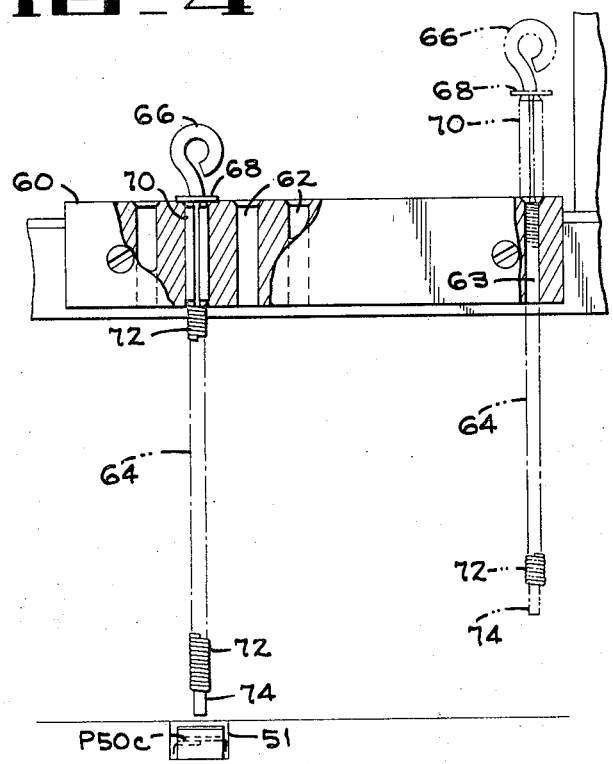
FIG_4
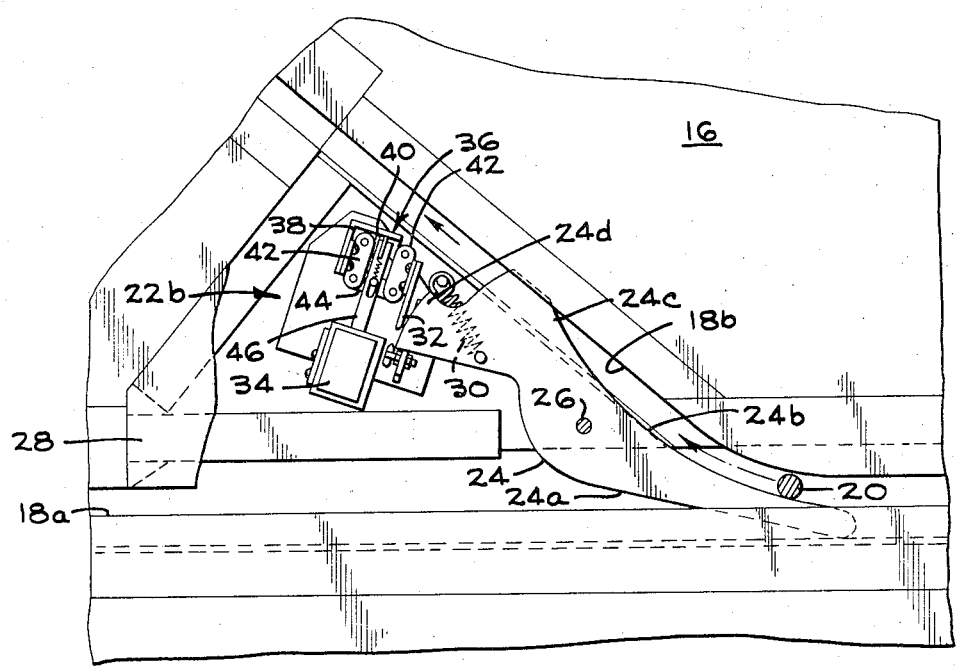
FIG_5

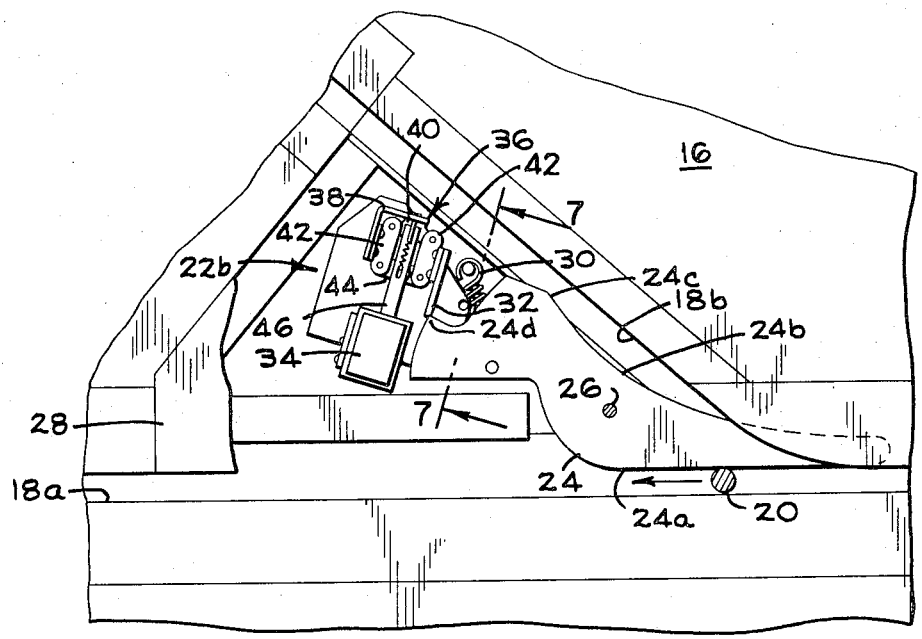
FIG_6
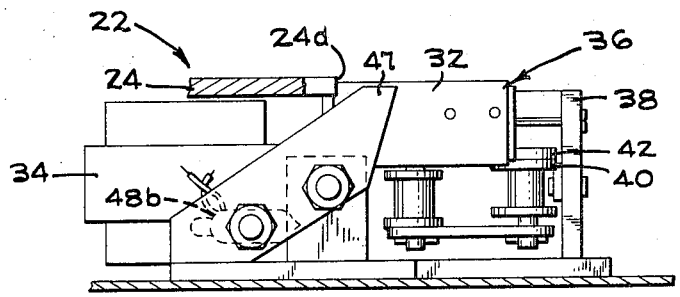
FIG_7

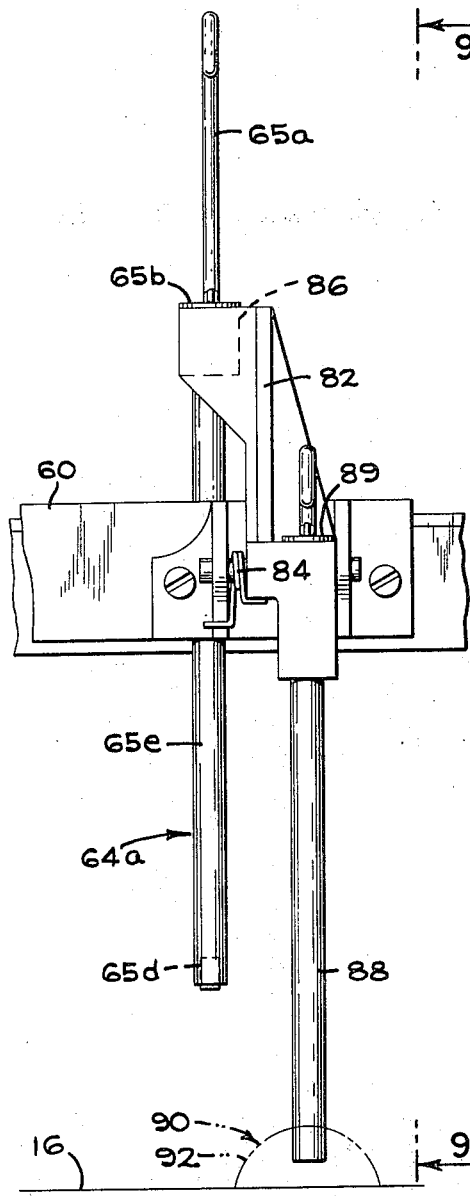
FIG_8
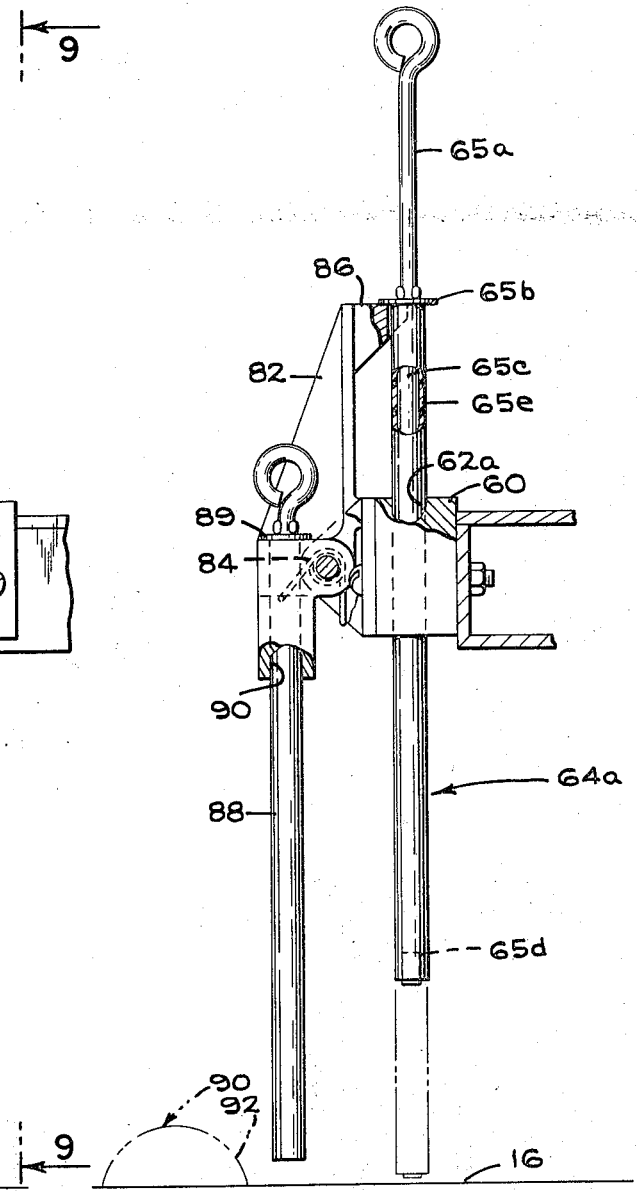
FIG_9
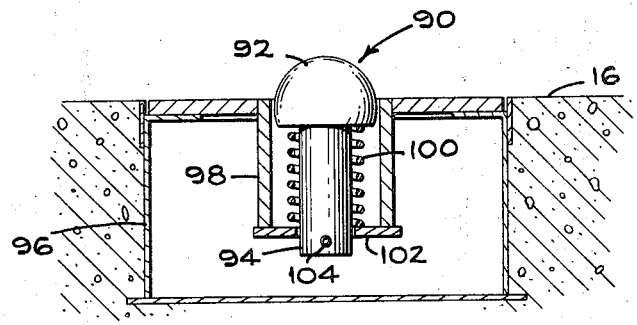
FIG_10

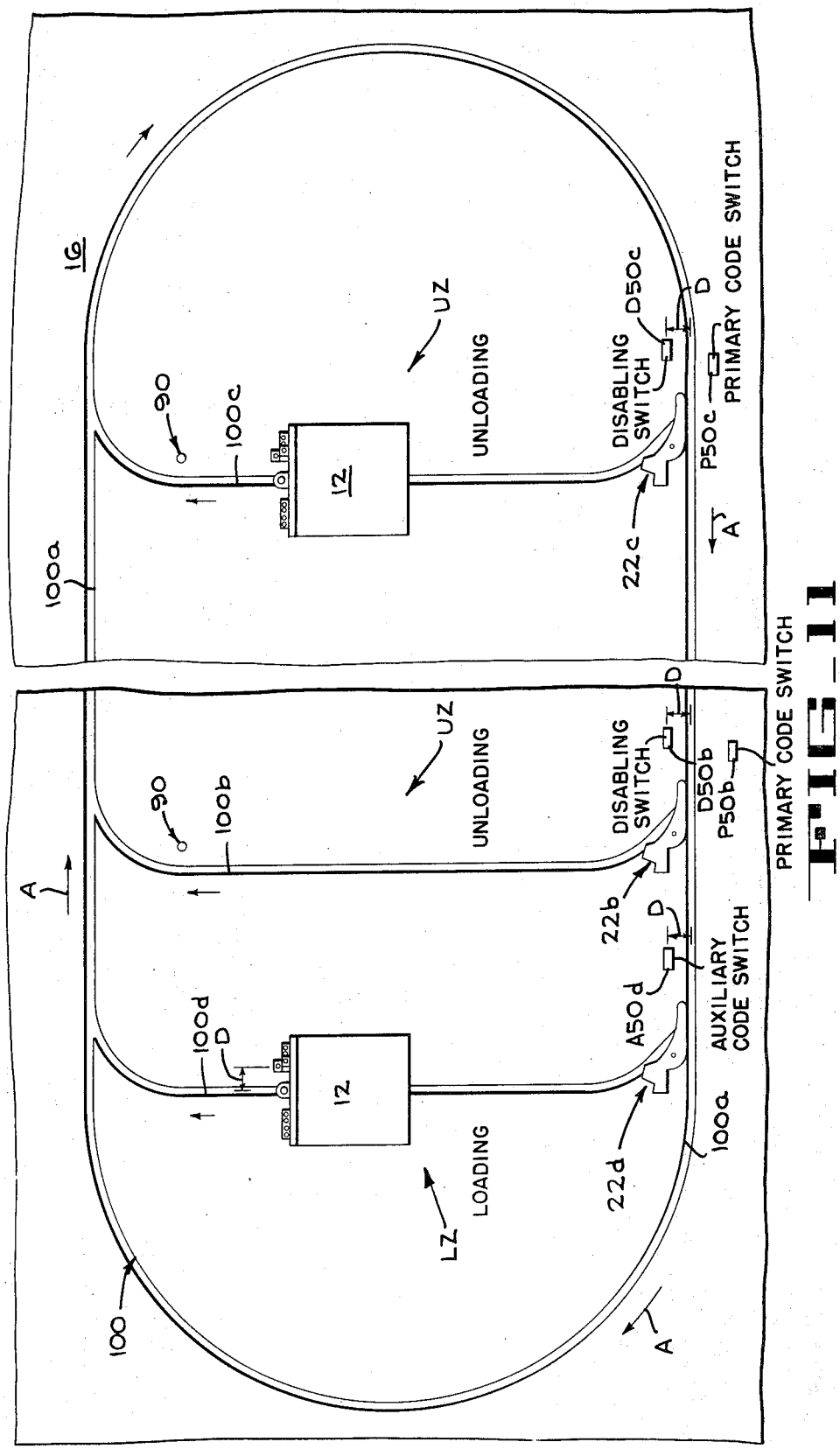

3,822,646

CONVEYOR SYSTEM WITH PRIMARY AND AUXILIARY CODE MECHANISMS

BACKGROUND OF THE INVENTION

Conveyor systems which carry material or articles in a factory or warehouse, for example, from one place to another frequently consist of a main line and a number of spur, or shunt, lines. Usually goods are loaded onto conveyor carts, or carriages, in a spur line, and code mechanism on the carts is set by the loading operator in accordance with the desired spur line destination of the goods. In the usual system, each spur line is connected to the main line by means of a switch which operates automatically in response to code mechanism on the particular carriage directed to that particular spur line. After the carriage is unloaded in the spur line, the code mechanism is reset by the unloading operator to direct the carriage back to the loading spur, or to some storage spur for empty carriages.

One problem with such a system stems from the inadvertent failure of the unloading operator to reset the coding mechanism to return the carriage to a loading or storage spur line. When the coding mechanism is not reset, the carriage circulates on the endless main line until it returns empty to the spur line where it was unloaded, since the carriage was originally, and still is, coded for that line. The empty carriage must then be recoded by the unloading operator, as it should have been when first unloaded, for return to the loading or storage spur line. Such a delay in returning the empty carriage for reloading, particularly when enough carriages are not available, can disrupt and delay the factory or warehouse operations.

SUMMARY OF THE INVENTION

The present invention is directed to a method and apparatus for automatically changing the code mechanism on a carriage, or cart, as it leaves the unloading spur line of a conveyor network. With the present invention, the unloading operator is relieved of the responsibility of changing the code on the carriage, and all carriages are promptly returned to the proper spur line for reloading or storage.

In accordance with the present invention, an additional, or auxiliary, code element on the carriage is automatically rendered effective by an actuator as the carriage leaves the spur line. This additional code element operates the switch at the desired loading or storage spur line to assure that the empty carriage reaches its proper destination. Preferably, the additional code element overrides the other (that is, the primary) code mechanism so that the empty carriage will not return to the unloading spur line if the unloading spur line is reached before the desired loading spur line.

It is therefore one object of the present invention to return empty carriages of a conveyor system promptly to a loading or storage spur from an unloading spur.

It is another object of the present invention automatically to reset the code mechanism on a conveyor carriage to direct the carriage to a loading or storage spur.

It is another object of the present invention to render effective a code element on a conveyor carriage after the carriage has been unloaded to return the carriage to a loading zone and to render other code elements on the carriage ineffective.

BRIEF DESCRIPTION OF THE DRAWINGS

FIG. 1 is a plan view of a conveyor system constructed in accordance with the present invention.

FIG. 2 is a view in perspective of a carriage of the system of FIG. 1.

FIG. 3 is a central longitudinal section of the carriage, taken on the line 3—3 of FIG. 2.

FIG. 4 is a fragmentary view, partly in cross-section, of the coding mechanism on the carriage, taken in the direction of line 4—4 of FIG. 2.

FIG. 5 is a plan view of a junction switch in the conveyor system of FIG. 1 with the switch in the spur-line-open position.

FIG. 6 is a plan view taken as the view of FIG. 5 but with the switch in the main-line-open position.

FIG. 7 is a section taken on the line 7—7 of FIG. 6.

FIG. 8 is a front view of the code changing mechanism of the system of FIG. 1, taken in the direction of the line 8—8 of FIG. 2.

FIG. 9 is a section taken on the line 9—9 of FIG. 8.

FIG. 10 is a section taken on the line 10—10 of FIG. 1.

FIG. 11 is a plan view of a modified conveyor system constructed in accordance with the present invention.

DESCRIPTION OF THE PREFERRED EMBODIMENT

Figure 12:
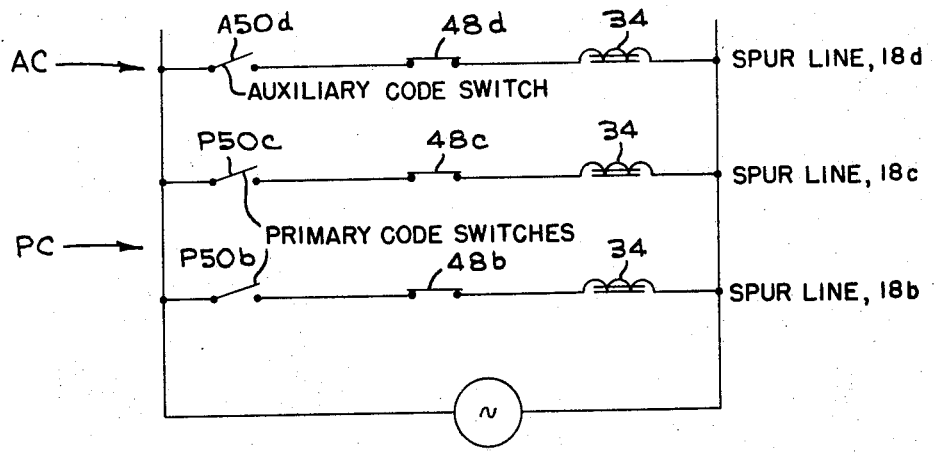
FIG. 12 is a schematic diagram of a circuit for the operation of the system of FIG. 1.

There is shown in FIG. 1 a conveyor system 10 having carts, or carriages, 12 to transport goods or material from a loading zone LZ to one of several unloading zones UZ in a factory or warehouse.

As shown best in FIGS. 2 and 3, each cart 12 has wheels 14, which are supported on the factory floor 16. The floor has slots 18 therein through which a tow pin 20 on the carriage extends. The pin is slidable vertically on the carriage for selective engagement with a chain 21 (FIG. 3) which is continuously driven during operation of the conveyor system beneath the slots 18 in the floor. The slots 18 serve to guide the carriages when the tow pins are received in the slots, and the slots therefore define paths along which the carriages are moved. The paths formed by the slots 18 include a main line 18a and spur lines 18b, 18c and 18d. Each spur line is connected at one end to the main line through a junction switch 22b, 22c, and 22d, respectively. Although the junction switches 22b, 22c, and 22d are identical, they will be indicated by the reference numeral 22 followed by the letter suffix used in the designation of the spur line with which they are associated. Systems of this type are disclosed, for example, in U.S. Pat. Nos. 3,526,192 and 3,556,012.

The junction switches 22b, 22c and 22d may be identical to the switch shown in the U.S. Pat. No. 3,526,192. As shown and described in that patent, which is incorporated by reference herein, the switch 22b (FIGS. 5, 6 and 7) has a switch plate 24 pivotally mounted on pin 26 in a switch housing 28. The switch plate 24 has a straight side 24a which defines one side of the main line slot 18a when the switch plate is in a main-line-open position, as shown in FIG. 6. The switch plate also has a curved side 24b which defines one side of the spur line slot 18b, 18c and 18d when the switch plate is in a spur-line-open position, as shown in FIG. 5. The switch plate is normally held in the spur line open position of FIG. 5 by a tension spring 30 connected between the housing 28 and the switch plate 24. As a carriage is moved into a spur line, the carriage tow pin 20 engages the cam surface 24c on the switch plate to urge the switch plate 24 back to the main-line-open position.

When the switch plate reaches the main-line-open position of FIG. 6, the corner 24d of the switch plate is engaged by a latch plate 32 which holds the switch plate in the main-line-open position against the bias of spring 30. The latch plate 32 is swung away from corner 24d to release the switch plate by energization of a solenoid 34.

The solenoid 34 is connected to latch plate 32 through a toggle mechanism, indicated generally at 36. The toggle mechanism, which is mounted in the housing by means of bracket 38, has a stationary link 40 secured to bracket 38. Links 42 are pivotally connected to opposite ends of link 40 and each is connected by a link 44 to the plunger 46 of solenoid 34. The latch plate 32 is secured to one of the links 42 so that when the solenoid is energized and the plunger 46 thereof drawn in, the link 42 which carries the latch plate 32 is swung away from the switch plate to release the switch plate for return by spring 30 to the normally spur-line-open position of FIG. 5.

As described more fully in U.S. Pat. No. 3,526,192, a cam plate 47 is mounted beneath the switch plate 24 and is rotated by the switch plate as the plate moves from one position to the other. A mercury switch mounted on the cam plate opens when the switch plate 24 is in the spur-line-open position and closes when the switch plate 24 is in the main-line-open position. Although the mercury switches for the three switches 22b, 22c, and 22d are identical, the designations 48b, 48c and 48d will be used to identify the mercury switches of the respective switches 22b, 22c and 22d.

A reed switch is mounted in an aluminum case 51 received in the floor near each junction switch 22b, 22c. The reed switches, which are all identical, are all part of a primary code mechanism PC. The switches are identified as P50b and P50c, the letter suffixes corresponding to the letter suffixes of the switches they control. Switches P50b and P50c are located ahead of or before (with respect to the direction of travel of the carriages indicated by arrows A) the switches 22b and 22c. Each switch P50b, P50c is positioned a particular distance from the main line 18, as shown in FIG. 1, the switch P50b for the switch 22b of spur line 18b being positioned a different distance from the main line than the other reed switches P50c to establish a coded distinction between the spur lines 18b and 18c. The energization of solenoid 34, and hence the operation of switches 22b, 22c, is effected through the reed switches P50b, P50c and mercury switches 48b, 48c in a manner which will be described in more detail hereinafter.

As shown best in FIGS. 2 and 4 (and as more fully described in U.S. Pat. No. 3,556,012) each carriage has a horizontal bar 60 mounted on each side of the front end thereof. Each bar has a series of holes 62 there through which can receive a code pin, or probe, 64. The code pin has a head 66, a washer 68 secured beneath the head, an upper body portion 70 received in bar 60, a lower body portion 72 in the form of a coiled spring, and a permanent magnet 74 received at the bottom of lower body portion 72. When the probe is received in hole 62, the washer 68 rests on the top of bar 60 and supports the probe pin in a reed switch operating position with the magnet closely spaced to the floor. If the lateral position (with respect to the main line slot 18a) of the probe pin on the carriage corresponds to the lateral position of the reed switch in the floor, the magnet will operate the reed switch as the carriage moves over the switch. It should be noted that if the probe pin is displaced one or more holes laterally from the reed switch, such as P50b at a particular switch 22b, the reed switch will not be operated by the probe. Since the reed switches are positioned in the floor different distances from the main line 18a at the different junction switches (22b, 22c), the probe pin, when placed in a particular hole 62, will operate only one particular reed switch (P50b, P50 c), and will therefore throw one, and only one, junction switch 22. Thus, the bar 60, probe pin 64 and reed switches P50b, P50c act as primary coding mechanism PC to direct a carriage to a particular spur line. A code pin, when not in use, may be stored in the outer end hole 63 which is smaller than hole 62 and incapable of receiving the upper body portion 70 of the code pin. Thus, a stored pin is incapable of operating the reed switches 50 because of the increased distance of the magnet 74 thereof from the floor. It should be noted that blocks 60 are placed on both sides of the carriage to increase the number of different codes, to accommodate a greater number of spur lines. It should also be noted that two reed switches, and two code pins, can be used if the number of spur lines exceed the number of lateral positions for the code pins provided by holes 62.

Conveyor systems of the above described type have been used before in conveying material or goods from a loading zone LZ in a factory or warehouse to an unloading zone UZ. Each carriage is coded by the loading operator by setting the probe pin in the appropriate hole for a particular spur line 18b or 18c. As the carriage, which moves along the main line after leaving the loading spur 18d, approaches the junction switch 22b or 22c at the unloading spur to which it is directed (say, for example, 18b), the reed switch P50b is operated to operate switch 22b and divert the carriage into the unloading spur 18b.

After the carriage is unloaded, the carriage is returned to the main line for return empty to the loading spur 18d. However, if the unloading operator has forgotten to change the code pin from the hole corresponding to the unloading spur 18b to the hole corresponding to the loading spur 18d, the carriage will merely circulate on the main line empty until it returns to the spur line 18b for which it was originally coded. The reed switch P50b at spur line 18b will then be reoperated and the carriage 21 will again be shunted into the unloading spur 18b. Since the carriage will be empty, the operator will realize his error and recode the carriage, by shifting the magnetic probe 64 in block 60, to direct the carriage back to the loading spur. In the meantime, however, the carriage has been circulating empty even though it may have been urgently needed at the loading spur.

To eliminate the possibility of this time wasting error from occurring, there is provided in accordance with the present invention an auxiliary code mechanism AC (FIG. 12) which includes an auxiliary code element 64a (FIGS. 2, 8 and 9) on the carriage, an auxiliary reed switch A50d, FIG. 1 in the floor, a conditioning element 88, and actuating members 90 in the floor. The auxiliary code element 64a is a pin which is normally ineffective but is rendered effective automatically as the carriage leaves the unloading spur. The auxiliary code pin is positioned to operate only the reed switch A50d (FIG. 1) (which is identical to reed switches P50b and P50c) and thus the junction switch 22d leading to the loading spur (or, if preferred, a junction switch leading to a carriage storage spur). For some conveyor systems (as described hereafter in conjunction with FIG. 11), it is desirable that means be provided to disable the other code mechanism on the carriage when the auxiliary code mechanism is rendered effective.

The auxiliary code mechanism code pin 64a, which is shown in FIGS. 8 and 9, has an upper body portion 65a, a washer 65b, and a lower body portion 65c. Body portion 65c may be similar in construction to the lower body portion 72 of code pins 64 and includes a magnet 65d similar to magnet 74. The lower body portion 65c is received in a hole 62a in block 60. Preferably a plastic sheath 65e is provided on the lower body portion to prevent any hang-up of the code pin 64a in the hole 62a of block 60. The hole 62a in bar 60 is spaced laterally a predetermined distance D from the carriage tow pin 20. The spacing D of the code pin 64a from the tow pin 20 equals the distance D of the reed switch A50d at the entrance of spur line 18d to the center of the slot 18a so that the code pin 64a will pass over that reed switch as the carriage approaches spur line 18d.

A bracket 82 is pivotally mounted on the front of bar 60 and is urged by spring 84 into an upright position as shown in FIG. 9. The bracket has a lip 86 which, when the bracket is upright, engages the under side of the washer 65b on the auxiliary code pin to hold the code pin in an inoperable position with the magnet at the lower end thereof spaced a substantial distance from the floor as shown in FIG. 9. The conditioning element, or tripping pin, 88 is received in a bore 90 in bracket 82. The pin 88 has a washer 89 which rests on bracket 82 to support the pin with the bottom thereof closely spaced from the floor. The pin is normally held in a vertical position by bracket 82.

Each unloading spur line has mounted in the floor near the exit end of the spur line (the end opposite the junction switch) a projecting member which defines the actuating member 90 of the auxiliary code mechanism. The projecting member 90 has a hemispherical head 92 and a cylindrical shank 94, as shown in FIG. 10. The projecting member is mounted in a housing 96 having a well 98 into which the projecting member closely fits. A compression spring 100 received over the shank engages the bottom 102 of the well 98 and the head 92 to urge the projecting member upwardly. The shank extends through the bottom of the well, and a pin 104 through the shank outside the well limits the upward movement of the projecting member. The spring 100 is strong enough to hold the head 92 of the member 90 above the floor level when engaged by tripping pin 88 so that the probe pin 64a will be released to the operative position (shown in dotted lines in FIG. 9). On the other hand, on engagement of the head 92 by a carriage wheel, or other vehicle, the spring 100 will be compressed to permit the head to sink beneath the floor level, avoiding damage to either the projecting member or the vehicle. Thus, the member 90 constitutes an actuating element for the code mechanism conditioning element 88.

In the system of FIG. 1, articles are loaded in the loading zone LZ on an empty carriage 12 on spur line 18d. At this time all the floor switches 22b, 22c, and 22d are in the main-line-open position. After the carriage 12 is loaded, the operator places the primary code pin 64 in the appropriate hole 62 of block 60 on the carriage to code the carriage for the desired spur line, say spur line 18b. At this time, the auxiliary code pin 64a is held in the inoperable position by bracket 82 as shown in FIG. 9.

The carriage leaves spur line 18d (which has no actuating member 90 therein) and travels on the main line 18a until the primary code pin 64 operates the primary code switch P50b at spur line 18b. As shown in FIG. 12, when the normally opened primary code reed switch P50b is operated to close, the solenoid 34 of the junction switch 22b at that spur line is energized because the contacts of the mercury switch 48b are closed when the junction switch is in the main-line-open position. The energization of solenoid 34 moves the junction switch at spur line 18b to the spur-line-open position of FIG. 5 to guide the carriage to the unloading zone. As the junction switch 22b shifts to the spur-line-open position, the mercury switch opens, deenergizing the solenoid 34. As the carriage tow pin moves past the junction switch 22b, the switch is shifted by the tow pin to the main-line-open position of FIG. 6 thereby reclosing the mercury switch 48b.

After the carriage is unloaded, the operator can release the carriage without resetting the code mechanism thereon. As the carriage exits from spur line 18b, the actuating member 90 trips the code conditioning element 88 to release code pin 64a. The code pin 64a drops to a position shown in phantom lines in FIG. 9 where the magnet 65d thereof is closely spaced from the floor.

The empty carriage will exit from spur line 18b and travel the main line 18a until the carriage reaches the auxiliary code switch A50d adjacent the entrance to the spur line 18d of the loading zone. The auxiliary code element 64a will operate the junction switch 22d to the loading zone in the same manner the primary code pin 64 operated the shunt switch 22b to the unloading zone, and the empty carriage will be returned to spur line 18d for reloading.

In the embodiment of the system shown in FIG. 1, the carriage, after leaving an unloading spur line, would always reach the entrance to the loading spur line before reaching the entrance to the unloading spur line from which it departed. Thus, it was sufficient in that arrangement of the system to provide an auxiliary code for the loading spur without disabling the primary code for the unloading spur since the carriage would arrive at its proper destination, the loading spur, and would never reach the unloading spur.

However, in some system arrangements, as shown in FIG. 11, it may be possible for a carriage, departing from an unloading spur, to return to the entrance of that spur before reaching the loading spur. Under those circumstances, the primary code mechanism on a carriage leaving an unloading spur empty will return the carriage to the same spur unless the primary code mechanism is somehow disabled. If the primary code mechanism is disabled, the empty carriage will proceed along the main line to the loading spur and, under the control of the auxiliary code mechanism, will enter that spur for loading.

In the system shown in FIG. 11, the slots in the floor define paths 100 for the carts. The main path, or line, is designated 100a, and the loading spur line which passes loading zone LZ is designated 100d. The unloading spur lines, which pass through unloading zones UZ, are designated 100b and 100c. As in the system of FIG. 1, a junction switch is positioned at the junction of the spur lines to the main line at the entrance end of the spur lines. The switches, which are identical to each other and to the previously described switch mechanism, are designated 22b, 22c and 22d. The primary code mechanism PC is defined by code pins 64 mounted on the carriages 12 and by reed switches P50b and P50c in the floor immediately proceeding (with respect to the direction of travel of the carriages indicated by arrows A) the switches 22b, 22c leading to the spur, or shunt, lines, as in the embodiment of FIG. 1.

In the embodiment of FIG. 11, the primary code mechanism for each unloading spur line 100b, 100c is disabled when an empty carriage 12 approaches that line so that the empty carriage will proceed to the loading spur line 100d. This is accomplished by using the auxiliary code mechanism (which is provided to operate auxiliary code switch A50d to direct the carriage into the loading spur line) to disable the primary code mechanism when the code pin 64a of the auxiliary code mechanism is in the lower, operating position. It will be recalled that the code pin 64a is released to the operating position by the protrusion 90 as an empty carriage leaves an unloading spur line. As will be noted in FIG. 11, reed switches D50b and D50c (which define the disabling mechanism DM) are placed along the main line adjacent the entrance to the unloading spur lines 100b and 100c, respectively. The disabling switches are placed a distance D from the main line so they will be operated by the code pin 64a when in the operating position. The disabling switches are also located ahead of the primary code switches (with respect to the direction of movement of the carriages 12) so that they will be encountered by the carriages, before the carriages 12 encounter the primary code switches.

Figure 13:
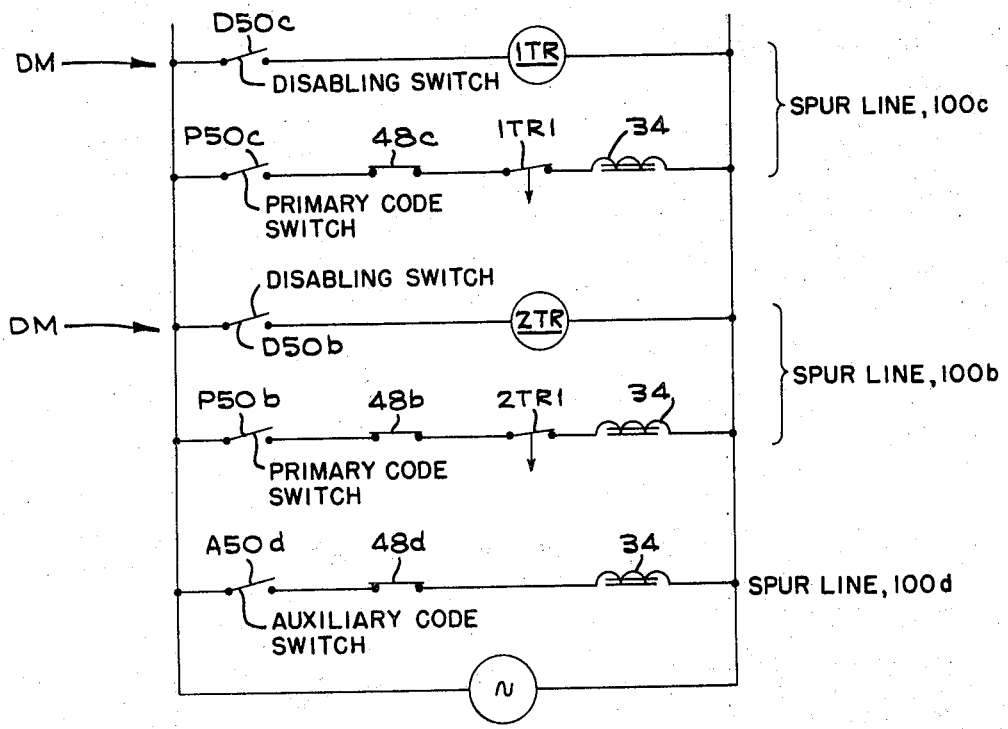
FIG. 13 is a schematic diagram of a switching circuit to render the primary code mechanism on a cart ineffective when the cart is empty.

The operation of the primary code disabling mechanism DM will best be understood by reference to FIG. 13 in conjunction with FIG. 11. As in the previously described embodiment, a carriage 12 is loaded in the loading zone LZ and the primary code mechanism is set, by placing code pin 64 in the appropriate hole 62, to direct the carriage to the desired unloading zone. At this time, the auxiliary code pin is in the raised, inoperative position.

When the carriage reaches the unloading spur line for which the loading operator coded the carriage, say spur line 100b, the primary code switch P50b for that spur line is closed. None of the other primary code switches (such as P50c) could be operated because the primary code switches are placed at different distances from the main line and cannot be operated by the code pin 64 when the code pin is positioned for spur line 100b. Since the auxiliary code pin 64a is elevated out of operating position at this time, none of the disabling switches D50b, D50c (which are operated only by the auxiliary code pin 64a and only when the auxiliary code pin 64a is in the lowered operating position) could be operated at this time. Thus, neither timer relay 1TR or 2TR could be operated, and the normally closed timer relay switches 1TR1, 2TR1 (which are normally closed, instant open, delay close switches) are closed. As described in conjunction with FIG. 12, the mercury switches 48b, 48c and 48d are closed when the junction switches 22b, 22c, 22d are in the main-line-open position. Therefore solenoid 34 of junction switch 22b is energized to release junction switch 22, and the switch is moved to the spur-line-open position by spring 30, when the primary code switch P50b closes. As the junction switch moves to the spur-line-open position, the mercury switch 48b opens to deenergize the relay 34. The carriage is thus guided into the shunt line 100b, shifting the switch to the main-line-open position and thereby reclosing the mercury switch 48b.

After the carriage has been unloaded in shunt line 100b, the carriage is released by the unloading operator for return to the main line. As the carriage passes the auxiliary code deactivating protrusion 90, the bracket 82 is tripped to release auxiliary code pin 64a. The empty carriage enters the main line and moves toward the entrance to the other unloading shunt line 100c. The disabling mechanism (reed switch D50c) is operated at the entrance to shunt line 100c, but the operation thereof, which is identical to the about-to-be described operation of the disabling mechanism (reed switch D50b) at shunt line 100b, will not be described in detail since the primary code mechanism on the carriage is coded only for shunt line 100b, and the carriage would not enter shunt line 100c even if there were no primary code disabling mechanism to prevent the entrance.

As the carriage reaches the entrance to shunt line 100b, the disabling switch D50b (which is positioned farther from the junction switch 22 along the main line 100a than the primary code switch P50b) is encountered first by the carriage, and the disabling switch D50b is closed by the auxiliary code pin 64a (which is positioned laterally from the main line the same distance D as all the disabling switches). Thus, as can be seen from FIG. 13, the timer relay 2TR is energized, opening the normally closed, instant open, delay closed switch contacts 2TR1. The switch contacts 2TR1 are held open 3 seconds, a sufficient time for the primary code pin 64 on the carriage to pass the primary code switch P50b for the shunt line 100b. Thus, although the primary code switch P50b is closed momentarily by the magnet in code pin 64, the solenoid 34 of junction switch 22b remains deenergized by virtue of the temporary opening of relay contacts 2TR1. After the code pin 64 passes the primary code switch P50b, the contacts thereof open.

As the carriage reaches the loading spur line 100d, the auxiliary code pin 64a operates auxiliary code switch A50d. The mercury switch contacts 48d are closed at this time since the junction switch 22d is in the main-line-open position, and the junction switch is released to move by spring 30 to the spur-line-open position, at which time the contacts of the mercury switch 48d open to deenergize the solenoid 34. Again, the junction switch 22d is reset by the carriage tow pin 20 which moves the switch back to the main-line-open position.

After the empty carriage is loaded, the operator recodes the primary code mechanism to direct the carriage to the desired shunt line and raises the auxiliary code pin 64a to the inoperative position.

Although the best mode contemplated for carrying out the present invention has been herein shown and described, it will be apparent that modification and variation may be made without departing from what is regarded to be the subject matter of the invention.

What is claimed is:

1. In a conveyor system having a main line and spur lines, said system having carriages with coding mechanism thereon operable when set to direct the carriages to selected spur lines, the improvement comprising an auxiliary code element mounted on at least some of the carriages operable when rendered effective to direct the carriage to a different spur line, and means in some of said spur lines to render said code element effective as a carriage traverses the spur line.

2. In a conveyor system having a main line and spur lines, said system having switches connecting said spur lines to said main line and having means to operate said switches, said system having carriages each with a primary code mechanism thereon operable when set to control a selected switch operating means, the improvement comprising an auxiliary code element mounted on at least some of the carriages operable when rendered effective to disable said selected switch operating means and to control a different switch operating means.

3. In a conveyor system having a main line and spur lines, said system having switches connecting said spur lines to said main line and having means to operate said switches, said system having carriages each with a primary code element thereon operable to control a particular switch operating means, the improvement comprising an auxiliary code element mounted on at least some of the carriages operable when conditioned for operation to control a different switch than the particular switch controlled by the primary code element, a conditioning element for each auxiliary code element to render said auxiliary code element operable upon actuation of said conditioning element, and means adjacent some of said spur lines to actuate said conditioning element as the carriage moves through the spur line.

4. In a conveyor system having a main line and spur lines, said system having switches connecting said spur lines to said main line and having means to operate said switches, said system having carriages each with a primary code mechanism thereon operable to control a particular switch operating means to switch the carriage into a particular spur line, the improvement comprising an auxiliary code mechanism mounted on the carriages operable when conditioned for operation to control a different switch than the particular switch controlled by the primary code mechanism, a conditioning element for each auxiliary code mechanism to render said auxiliary code mechanism operable upon actuation of said conditioning element, means adjacent some of said spur lines to actuate said conditioning element as the carriage moves through the spur line, and means operable when the auxiliary code mechanism is conditioned for operation to render ineffective said primary code mechanism.

5. In a conveyor system having a main line and spur lines, and having carriages movable along said lines, said system having switches connecting said spur lines to said main line and having a switch actuating member adjacent each switch, said switch actuating members positioned laterally with respect to a passing carriage to different extents to render said switches code identifiable, said carriages having a primary code pin mounted thereon in a selected position to operate a selected switch as the carriage approaches a selected spur line, the improvement comprising an auxiliary code pin operable when released to an operating position to operate a particular switch leading to a particular spur line, and means to release said auxiliary code pin as a carriage leaves one of said selected spur lines.

6. The conveyor system of claim 1 wherein the auxiliary code element includes a code pin positionable alternatively in an effective operating position and an ineffective position, said means to render said code element effective constituting a projection in the spur line operable to shift the auxiliary code pin to the effective operating position as the carriage moves from the unloading zone.

7. The conveyor system of claim 2 wherein a disabling member is mounted along the main line at each of said selected switch operating means but not at said different switch operating means, said auxiliary code element operable when rendered effective to operate said disabling members and said different switch operating means to assure delivery of the carriage only to the spur leading from the switch controlled by said different switch operating means.

8. The conveyor system of claim 3 wherein said auxiliary code element is shiftable on the carriage between an elevated inoperable position and a lowered operating position, said conditioning element mounted on the carriage and positionable thereon to hold said auxiliary code element in the elevated inoperable position, and said means to actuate said conditioning element constituting a projection in the path of said conditioning element to trip said conditioning element as the carriage moves along the spur line and release the auxiliary code element to an operating position.

9. The conveyor system of claim 4 in which said means to operate said switches includes primary code electrical switches positioned different distances from said main line for operation of a selected primary code switch by the primary code mechanism on the carriage in accordance with the setting of said code mechanism on the carriage, said means operable to render ineffective said primary code mechanism consisting of disabling electrical switches along the main line at equal lateral distance from the main line for operation by the auxiliary code mechanism on the carriage.

10. The conveyor system of claim 5 wherein said means to release said auxiliary code pin includes a bracket on the carriage shiftable between a position to hold said auxiliary code pin in an inoperable position and a position to release said pin to an operable position, and includes a projection adjacent the spur line to shift said bracket from the pin holding position to the pin releasing position.

11. In a conveyor system having a main line and spur lines, said system having junction switches connecting said spur lines to said main line and having primary code electrical switches adjacent said main line and spaced therefrom at different distances to render said electrical switches code identifiable, said system having carriages each with a primary code pin positionable thereon in different lateral positions to actuate a particular electrical switch in accordance with the position of the pin on the carriage, an auxiliary code pin mounted on the carriage in a particular lateral position and shiftable between an elevated inoperable position and a lowered operable position, a bracket mounted on the carriage adjacent the auxiliary code pin, said bracket shiftable between a pin holding position where the auxiliary code pin is held in an inoperable position and a pin releasing position where the auxiliary code pin is lowered to an operating position, and a projection in some of said spur lines to trip said bracket and release the auxiliary code pin for operation of the electrical switch in the path of the code pin for operation of the junction switch controlled thereby and transfer of the carriage to the spur line leading from said junction switch.

12. The conveyor system of claim 11 including an electrical disabling switch positioned along the main adjacent each primary code electrical switch and in the path of the auxiliary code pin on the carriage, said disabling switches connected in circuit with said primary code electrical switches to render said primary code switches ineffective when said auxiliary code pin is in an operative position on the carriage and the carriage passes said disabling switch and operates said switch.

* * * * *